(12) United States Patent
Jimenez et al.

(10) Patent No.: US 7,917,418 B2
(45) Date of Patent: Mar. 29, 2011

(54) EFFICIENT DATA DISSEMINATION FOR FINANCIAL INSTRUMENTS

(75) Inventors: Mario Jimenez, Orlando, FL (US); Joseph Burgee, Glenview, IL (US); Kevin Mueller, Orlando, FL (US)

(73) Assignee: Archipelago Holdings, Inc., Chicago, IL (US)

( * ) Notice: Subject to any disclaimer, the term of this patent is extended or adjusted under 35 U.S.C. 154(b) by 269 days.

(21) Appl. No.: 11/634,020

(22) Filed: Dec. 4, 2006

(65) Prior Publication Data

US 2008/0133395 A1   Jun. 5, 2008

(51) Int. Cl.
*G06Q 40/00* (2006.01)
(52) U.S. Cl. .................... 705/36 R; 705/35; 705/37
(58) Field of Classification Search ............ 705/36, 705/36 R
See application file for complete search history.

(56) References Cited

U.S. PATENT DOCUMENTS

| | | | |
|---|---|---|---|
| 5,101,353 A | 3/1992 | Lupien et al. | |
| 5,560,580 A | 10/1996 | Almoslino | |
| 5,845,266 A | 12/1998 | Lupien et al. | |
| 5,905,974 A | 5/1999 | Fraser et al. | |
| 5,950,176 A * | 9/1999 | Keiser et al. | 705/36 R |
| 6,012,046 A | 1/2000 | Lupien et al. | |
| 6,098,051 A | 8/2000 | Lupien et al. | |
| 6,278,982 B1 | 8/2001 | Korhammer et al. | |
| 6,343,278 B1 | 1/2002 | Jain et al. | |
| 6,377,940 B2 | 4/2002 | Tilfors et al. | |
| 6,405,180 B2 | 6/2002 | Tilfors et al. | |
| 6,408,282 B1 | 6/2002 | Buist | |
| 6,505,174 B1 | 1/2003 | Keiser et al. | |
| 6,615,188 B1 | 9/2003 | Breen et al. | |
| 6,618,707 B1 | 9/2003 | Gary | |
| 6,714,948 B1 | 3/2004 | Richards | |
| 6,829,589 B1 | 12/2004 | Saliba | |
| 6,832,210 B1 | 12/2004 | Li | |
| 6,850,907 B2 | 2/2005 | Lutnick et al. | |
| 6,963,856 B2 | 11/2005 | Lutnick et al. | |
| 6,983,260 B2 | 1/2006 | Hummelgren | |
| 7,162,448 B2 | 1/2007 | Madoff et al. | |
| 7,184,982 B1 | 2/2007 | Howorka et al. | |
| 7,197,483 B2 | 3/2007 | Brady et al. | |
| 7,209,896 B1 | 4/2007 | Serkin et al. | |

(Continued)

FOREIGN PATENT DOCUMENTS

AU     2006/244479     11/2006

(Continued)

OTHER PUBLICATIONS

McKinnon, Julie M., Toledo Ohio-Based Dane Corp. Could Lose NYSE Listing in Takeover Battle, Aug. 3, 2003, The Blade.*

(Continued)

*Primary Examiner* — Jagdish N Patel
*Assistant Examiner* — Kevin Poe
(74) *Attorney, Agent, or Firm* — Milbank Tweed Hadley & McCloy LLP

(57) ABSTRACT

An efficient data dissemination method and system for disseminating financial information is disclosed. The system and method designate instruments listed on a reporting market center that have not traded within a pre-defined time period as "dark." The information for instruments designated as "dark" is suppressed and not reported to the market, through data consolidators, until the instrument trades again or is manually overridden.

31 Claims, 4 Drawing Sheets

U.S. PATENT DOCUMENTS

| | | |
|---|---|---|
| 7,225,153 B2 | 5/2007 | Lange |
| 7,242,669 B2 | 7/2007 | Bundy et al. |
| 7,246,090 B1 * | 7/2007 | Thomas ...................... 705/36 R |
| 7,246,093 B1 | 7/2007 | Katz |
| 7,249,086 B2 | 7/2007 | Bloom et al. |
| 7,356,498 B2 | 4/2008 | Kaminsky et al. |
| 7,383,220 B1 | 6/2008 | Keith |
| 7,401,046 B2 | 7/2008 | Hollerman et al. |
| 7,467,110 B2 | 12/2008 | Muller et al. |
| 7,685,057 B2 | 3/2010 | Chiulli et al. |
| 2001/0037284 A1 | 11/2001 | Finkelstein et al. |
| 2002/0010672 A1 | 1/2002 | Waelbroeck et al. |
| 2002/0010673 A1 | 1/2002 | Muller et al. |
| 2002/0019795 A1 | 2/2002 | Madoff et al. |
| 2002/0019799 A1 | 2/2002 | Ginsberg et al. |
| 2002/0042765 A1 | 4/2002 | Dawson |
| 2002/0062273 A1 | 5/2002 | Perkel et al. |
| 2002/0082979 A1 | 6/2002 | Sands et al. |
| 2002/0091617 A1 | 7/2002 | Keith |
| 2002/0091621 A1 | 7/2002 | Conklin et al. |
| 2002/0120511 A1 | 8/2002 | Hanes |
| 2002/0128951 A1 | 9/2002 | Kiron et al. |
| 2002/0128955 A1 | 9/2002 | Brady et al. |
| 2002/0128958 A1 | 9/2002 | Slone |
| 2002/0143676 A1 | 10/2002 | Kiron et al. |
| 2002/0147670 A1 | 10/2002 | Lange |
| 2002/0161687 A1 | 10/2002 | Serkin et al. |
| 2002/0169703 A1 | 11/2002 | Lutnick et al. |
| 2002/0184135 A1 | 12/2002 | Zakaria |
| 2002/0184136 A1 | 12/2002 | Cleary |
| 2002/0198815 A1 | 12/2002 | Greifeld et al. |
| 2002/0198816 A1 | 12/2002 | Gilbert et al. |
| 2003/0004851 A2 | 1/2003 | Kiron et al. |
| 2003/0004858 A1 | 1/2003 | Schmitz et al. |
| 2003/0009400 A2 | 1/2003 | Kiron et al. |
| 2003/0009413 A1 | 1/2003 | Furbush et al. |
| 2003/0009414 A1 | 1/2003 | Furbush et al. |
| 2003/0009531 A1 | 1/2003 | Richmann et al. |
| 2003/0014351 A1 | 1/2003 | Neff et al. |
| 2003/0023536 A1 | 1/2003 | Hollerman et al. |
| 2003/0040955 A1 | 2/2003 | Anaya et al. |
| 2003/0041006 A1 | 2/2003 | Bunda |
| 2003/0083974 A1 | 5/2003 | Bunda |
| 2003/0093343 A1 | 5/2003 | Huttenlocher et al. |
| 2003/0097328 A1 | 5/2003 | Lundberg et al. |
| 2003/0115131 A1 | 6/2003 | Heaton et al. |
| 2003/0130920 A1 | 7/2003 | Freund |
| 2003/0130925 A1 | 7/2003 | Malitzis |
| 2003/0130926 A1 | 7/2003 | Moore et al. |
| 2003/0135443 A1 | 7/2003 | Moore et al. |
| 2003/0139998 A1 | 7/2003 | Gilbert et al. |
| 2003/0172024 A1 | 9/2003 | Kokis et al. |
| 2003/0177082 A1 | 9/2003 | Buckwalter |
| 2003/0191703 A1 | 10/2003 | Chen et al. |
| 2003/0216932 A1 | 11/2003 | Foley |
| 2003/0229557 A1 | 12/2003 | Richmann et al. |
| 2003/0233307 A1 | 12/2003 | Salvadori et al. |
| 2004/0030630 A1 | 2/2004 | Tilfors et al. |
| 2004/0044610 A1 | 3/2004 | Fraser et al. |
| 2004/0059666 A1 | 3/2004 | Waelbroeck et al. |
| 2004/0088242 A1 | 5/2004 | Ascher et al. |
| 2004/0143538 A1 | 7/2004 | Korhammer et al. |
| 2004/0143542 A1 | 7/2004 | Magill et al. |
| 2004/0177024 A1 | 9/2004 | Bok et al. |
| 2004/0177026 A1 | 9/2004 | Balabon |
| 2004/0210508 A1 | 10/2004 | Bohnenberger |
| 2004/0210511 A1 | 10/2004 | Waelbroeck et al. |
| 2004/0215538 A1 | 10/2004 | Smith et al. |
| 2004/0225592 A1 | 11/2004 | Churquina |
| 2004/0236662 A1 | 11/2004 | Korhammer et al. |
| 2004/0236669 A1 | 11/2004 | Horst et al. |
| 2004/0243502 A1 | 12/2004 | Slowik et al. |
| 2004/0254804 A1 | 12/2004 | Peterffy et al. |
| 2004/0254877 A1 * | 12/2004 | Buckwalter et al. ............ 705/37 |
| 2004/0267655 A1 | 12/2004 | Davidowitz et al. |
| 2005/0010481 A1 | 1/2005 | Lutnick et al. |
| 2005/0075963 A1 | 4/2005 | Balabon |
| 2005/0096999 A1 | 5/2005 | Newell et al. |
| 2005/0119964 A1 | 6/2005 | Brady et al. |
| 2005/0125316 A1 | 6/2005 | Levering et al. |
| 2005/0137962 A1 | 6/2005 | Penney et al. |
| 2005/0160024 A1 | 7/2005 | Soderborg et al. |
| 2005/0171887 A1 | 8/2005 | Daley et al. |
| 2005/0171888 A1 | 8/2005 | Daley et al. |
| 2005/0171889 A1 | 8/2005 | Daley et al. |
| 2005/0171890 A1 | 8/2005 | Daley et al. |
| 2005/0171891 A1 | 8/2005 | Daley et al. |
| 2005/0171895 A1 | 8/2005 | Howorka et al. |
| 2005/0197916 A1 | 9/2005 | Newell et al. |
| 2005/0222936 A1 | 10/2005 | Panariti et al. |
| 2005/0228739 A1 | 10/2005 | Leibowitz |
| 2005/0240510 A1 | 10/2005 | Schweickert et al. |
| 2005/0273407 A1 | 12/2005 | Black et al. |
| 2005/0273408 A1 * | 12/2005 | Bandman et al. ............... 705/35 |
| 2005/0273419 A1 | 12/2005 | Ogg et al. |
| 2005/0283415 A1 | 12/2005 | Studnitzer et al. |
| 2005/0283421 A1 | 12/2005 | Hatheway et al. |
| 2005/0283426 A1 | 12/2005 | Krishnasami et al. |
| 2005/0283427 A1 | 12/2005 | Owens et al. |
| 2006/0020536 A1 | 1/2006 | Renton et al. |
| 2006/0031157 A1 | 2/2006 | Gianakouros et al. |
| 2006/0089898 A1 | 4/2006 | Durkin et al. |
| 2006/0089899 A1 | 4/2006 | Durkin et al. |
| 2006/0136318 A1 | 6/2006 | Rafieyan et al. |
| 2006/0136326 A1 | 6/2006 | Heckman et al. |
| 2006/0149659 A1 | 7/2006 | Carone et al. |
| 2006/0161494 A1 | 7/2006 | Littlewood |
| 2006/0184444 A1 | 8/2006 | McConaughy et al. |
| 2006/0206404 A1 | 9/2006 | Hatheway et al. |
| 2006/0206407 A1 | 9/2006 | Troxel et al. |
| 2006/0235786 A1 | 10/2006 | DiSalvo |
| 2006/0253374 A1 | 11/2006 | Addock et al. |
| 2006/0259391 A1 | 11/2006 | Schoen et al. |
| 2006/0277137 A1 | 12/2006 | Claus et al. |
| 2006/0277138 A1 | 12/2006 | Ross et al. |
| 2007/0022041 A1 | 1/2007 | Durkin et al. |
| 2007/0043647 A1 | 2/2007 | Bickford |
| 2007/0055607 A1 | 3/2007 | Wunsch et al. |
| 2007/0078753 A1 | 4/2007 | Cormack et al. |
| 2007/0112693 A1 | 5/2007 | Cushing |
| 2007/0198391 A1 | 8/2007 | Dreyer et al. |
| 2007/0244792 A1 * | 10/2007 | Couperier et al. ............... 705/37 |
| 2008/0040290 A1 * | 2/2008 | Harris ........................ 705/36 R |
| 2010/0030704 A1 | 2/2010 | Griffin et al. |

FOREIGN PATENT DOCUMENTS

| | | |
|---|---|---|
| AU | 2006/244483 | 11/2006 |
| AU | 2006/244499 | 11/2006 |
| AU | 2006/244562 | 11/2006 |
| AU | 2006/244563 | 11/2006 |
| AU | 2006/244564 | 11/2006 |
| AU | 2006/244566 | 11/2006 |
| EP | 1 321 870 | 9/2003 |
| JP | 2008/510226 | 11/2007 |
| JP | 2008/510109 | 11/2008 |
| JP | 2008/510110 | 11/2008 |
| JP | 2008/510238 | 11/2008 |
| SG | 2007/166754 | 11/2007 |
| SG | 2007/166762 | 11/2007 |
| SG | 2007/166770 | 11/2007 |
| SG | 2007/166788 | 11/2007 |
| SG | 2007/166796 | 11/2007 |
| SG | 2007/166804 | 11/2007 |
| SG | 2007/166812 | 11/2007 |
| WO | WO 02/07039 | 2/2001 |
| WO | WO 01/22322 | 3/2001 |
| WO | WO 01/22339 | 3/2001 |
| WO | WO 01/52166 | 7/2001 |
| WO | WO 01/75733 | 10/2001 |
| WO | WO 01/90925 | 11/2001 |
| WO | WO 02/09008 | 1/2002 |
| WO | WO 2004/008296 | 1/2004 |
| WO | WO 2005/010790 | 2/2005 |
| WO | WO 2005/036354 | 4/2005 |
| WO | PCTUS2006016683 | 11/2006 |
| WO | PCTUS2006016684 | 11/2006 |
| WO | PCTUS2006016685 | 11/2006 |

| WO | PCTUS2006016701 | 11/2006 |
| WO | PCTUS2006017249 | 11/2006 |
| WO | PCTUS2006017253 | 11/2006 |
| WO | PCTUS2006017296 | 11/2006 |
| WO | PCTUS2006036461 | 4/2007 |
| WO | PCTUS2006036878 | 4/2007 |
| WO | PCTUS2007016572 | 1/2008 |
| WO | PCTUS2007016682 | 1/2008 |
| WO | PCTUS2007016856 | 1/2008 |
| WO | PCTUS2007016857 | 1/2008 |
| WO | PCTUS2007016718 | 2/2008 |
| WO | PCTUS2007016571 | 3/2008 |
| WO | PCTUS2007024921 | 6/2008 |

OTHER PUBLICATIONS

Jun. 18, 2009 International Preliminary Report on Patentability PCT/US2007/024921.
A Taxonomy of Automated Trade Execution Systems, Ian Domowitz, Journal of International Money and Finance, (1993), 12, pp. 607-631.
U.S. Appl. No. 61/191,055, filed Oct. 28, 2008, Neuner, et al.
U.S. Appl. No. 11/881,788, filed Jun. 18, 2009, Adcock, et al.
U.S. Appl. No. 11/881,789, filed Sep. 18, 2009, Adcock, et al.
U.S. Appl. No. 11/881,064, filed Sep. 18, 2009, Adcock, et al.
U.S. Appl. No. 11/880,852, filed May 14, 2009, Armstrong, et al.
U.S. Appl. No. 11/880,840, filed Mar. 12, 2009, Adcock, et al.
U.S. Appl. No. 11/525,363, filed Apr. 5, 2007, Cormack, et al.
U.S. Appl. No. 11/527,797, filed Mar. 29, 2007, Drake, et al.
U.S. Appl. No. 12/807,338, filed Sep. 2, 2010, Adcock, et al.
U.S. Appl. No. 60/721,165, filed Sep. 28, 2005, Drake, et al.
U.S. Appl. No. 11/122,679, filed May 5, 2005, Adcock, et al.
U.S. Appl. No. 11/122,689, filed Jul. 27, 2010, Adcock, et al.
U.S. Appl. No. 11/345,420, filed Nov. 9, 2006, Adcock, et al.
U.S. Appl. No. 11/345,421, filed Nov. 9, 2009, Adcock, et al.
U.S. Appl. No. 11/416,913, filed Nov. 9, 2006, Adcock, et al.
U.S. Appl. No. 11/122,498, filed May 5, 2005, Brill, et al.
U.S. Appl. No. 11/416,942, filed Nov. 9, 2006, Adcock, et al.
U.S. Appl. No. 11/416,756, filed Nov. 9, 2006, Adcock, et al.
U.S. Appl. No. 11/416,943, filed Nov. 9, 2006, Adcock, et al.
U.S. Appl. No. 11/416,710, filed Nov. 9, 2006, Adcock, et al.
International Search Report & Written Opinion, PCT/US07/16856, Nov. 10, 2008.
International Search Report for PCT/US06/16685, Sep. 17, 2007.
International Preliminary Report on Patentability, PCT/US2007/016572, Apr. 15, 2009.
John Hintze, Direct Order Decision Polarizes Exchanges, Security Industry News, Jun. 13, 2005, Securities Data Publishing.
Peter Chapman, Special Feature: Fragmented Dealing Under Fire, Traders, May 1, 2000, Securities Data Publishing.
Young, Lee, W., International Search Report May 18, 2007, 4 pages.
Young, Lee, W., International Search Report Sep. 12, 2007, 6 pages.
Young, Lee, W., International Search Report Aug. 9, 2007, 6 pages.
Young, Lee, W., International Search Report Aug. 29, 2007, 7 pages.
Young, Lee, W., International Search Report Sep. 5, 2007, 8 pages.
Young, Lee, W., International Search Report Aug. 7, 2007, 5 pages.
Young, Lee, W., International Search Report Aug. 29, 2007, 6 pages.
Australian Patent Office Written Opinion & Search Report, mailed Dec. 1, 2008.
Austrian Patent Office Written Opinion & Search Report, mailed Jan. 9, 2009.
Austrian Patent Office Written Opinion & Search Report, mailed Feb. 13, 2009.
Austrian Patent Office Search Report and Written Opinion, mailed Mar. 6, 2009.
Austrian Patent Office Search Report and Written Opinion, mailed Mar. 13, 2009.
Notice of Allowance and Examiner's Amendment, Nov. 16, 2009, for U.S. Appl. No. 11/345,420.
Phlx Allows Floor Broker Crossing, Wall Street Letter, New York, Feb. 24, 2003, p. 1.
Anonymous, Rising tide lifts all boats in institutional equities, The Investment Dealers' digest: IDD, New York, Mar. 28, 1994, vol, 60, Iss. 13, p. 16, 5 pages.
Headstrong Buys assets of Elind Software Provider; Noticiasfinancieras, Miami Nov. 1, 2004, p. 1.
Non-Final Rejection, Feb. 26, 2008 for U.S. Appl. No. 11/122,689.
Response to Non-Final, Aug. 29, 2008 for U.S. Appl. No. 11/122,689.
Final Rejection, Nov. 18, 2008 for U.S. Appl. No. 11/122,689.
Response to Final, Mar. 17, 2009 for U.S. Appl. No. 11/122,689.
Examiner Interview, Apr. 13, 2009 for U.S. Appl. No. 11/122,689.
Non-Final Rejection, Apr. 27, 2009 for U.S. Appl. No. 11/122,689.
Non-Final Rejection, Apr. 1, 2008 for U.S. Appl. No. 11/122,679.
Response to Non-Final, Oct. 6, 2008 for U.S. Appl. No. 11/122,679.
Non-Final Rejection, Jan. 5, 2009 for U.S. Appl. No. 11/122,679.
Response to Non-Final, Apr. 6, 2009 for U.S. Appl. No. 11/122,679.
Examiner Interview, May 4, 2009 for U.S. Appl. No. 11/122,679.
Response to Non-Final, Jun. 17, 2009 for U.S. Appl. No. 11/122,679.
Non-Final Rejection, Dec. 9, 2008 for U.S. Appl. No. 11/345,420.
Response to Non-Final, Mar. 16, 2009 for U.S. Appl. No. 11/345,420.
Notice of Allowance, Jul. 23, 2009 for U.S. Appl. No. 11/345,420.
Non-Final Rejection, Feb. 12, 2008 for U.S. Appl. No. 11/122,498.
Response to Non-Final, Aug. 14, 2008 for U.S. Appl. No. 11/122,498.
Final Rejection, Sep. 19, 2008 for U.S. Appl. No. 11/122,498.
Response to Final, Jan. 9, 2009 for U.S. Appl. No. 11/122,498.
Non-Final Rejection, Apr. 15, 2009 for U.S. Appl. No. 11/122,498.
Non-Final Rejection, Jun. 27, 2008 for U.S. Appl. No. 11/345,421.
Response to Non-Final, Sep. 22, 2008 for U.S. Appl. No. 11/345,421.
Final Rejection, Jan. 26, 2009 for U.S. Appl. No. 11/345,421.
Response to Final, May 22, 2009 for U.S. Appl. No. 11/345,421.
Non-Final Rejection, Sep. 30, 2008 for U.S. Appl. No. 11/416,942.
Response to Non-Final, Jan. 12, 2009 for U.S. Appl. No. 11/416,942.
Final Rejection, Apr. 23, 2009 for U.S. Appl. No. 11/416,942.
Non-Final Rejection, Apr. 4, 2008 for U.S. Appl. No. 11/416,710.
Informal Response to Non-Final, Aug. 4, 2008 for U.S. Appl. No. 11/416,710.
Notice to Applicant re: Informal Response to Non-Final, Sep. 11, 2008 for U.S. Appl. No. 11/416,710.
Response to Non-Final, Sep. 19, 2008 for U.S. Appl. No. 11/416,710.
Non-Final Rejection, Dec. 30, 2008 for U.S. Appl. No. 11/416,710.
Response to Non-Final, Mar. 27, 2009 for U.S. Appl. No. 11/416,710.
Non-Final Rejection, Dec. 29, 2008 for U.S. Appl. No. 11/416,913.
Response to Non-Final, Mar. 25, 2009 for U.S. Appl. No. 11/416,913.
Final Rejection, Aug. 3, 2009 for U.S. Appl. No. 11/416,913.
Restriction Requirement, Mar. 27, 2009 for U.S. Appl. No. 11/416,756.
Response to Non-Final, Apr. 27, 2009 for U.S. Appl. No. 11/416,756.
Non-Final Rejection, Aug. 4, 2009 for U.S. Appl. No. 11/416,756.
Notice of Allowance, Oct. 14, 2010 for U.S. Appl. No. 11/122,679.
Notice of Allowance, Sep. 29, 2010 for U.S. Appl. No. 11/122,498.
Supplemental Notice of Allowability, Oct. 13, 2010 for U.S. Appl. No. 11/122,498.
International Search Report and Written Opinion, May 12, 2008 for PCT/US2007/024921.
International Search Report and Written Opinion, Jun. 17, 2008 for PCT/US2007/016571.
International Search Report, Jun. 17, 2008 for PCT/US2007/016682.
International Search Report, Sep. 18, 2008 for PCT/US2007/016856.
International Search Report and Examination report, Oct. 2, 2009 for SG 2007166812.
International Search Report, Sep. 5, 2008 for PCT/US2007/016857.
International Search Report and Written Opinion, Jul. 2, 2008 for PCT/US2007/016572.
Non-Final Rejection, Sep. 3, 2008 for U.S. Appl. No. 11/416,943.
Response to Non-Final, Dec. 5, 2008 for U.S. Appl. No. 11/416,943.
Final Rejection, Mar. 17, 2009 for U.S. Appl. No. 11/416,943.
Response to Final, Jun. 17, 2009 for U.S. Appl. No. 11/416,943.
Response to Non-final, Sep. 29, 2010 for U.S. Appl. No. 11/881,788.
International Search Report, Jun. 17, 2008 for PCT/US2006/036461.
Non-Final Rejection, Sep. 15, 2008 for U.S. Appl. No. 11/527,797.
Response to Non-Final, Dec. 15, 2008 for U.S. Appl. No. 11/527,797.
Final Rejection, Mar. 30, 2009 for U.S. Appl. No. 11/527,797.
Response to Final, May 19, 2009 for U.S. Appl. No. 11/527,797.
Notice of Allowance, Aug. 21, 2009 for U.S. Appl. No. 11/122,679.
Examiner Interview, Sep. 9, 2009 for U.S. Appl. No. 11/122,679.

Notice of Allowance, Jan. 15, 2010 for U.S. Appl. No. 11/122,679.
Notice of Allowance, Aug. 16, 2010 for U.S. Appl. No. 11/122,679.
EIC3600 Search Results, Jul. 22, 2009 for U.S. Appl. No. 11/122,679.
Examiner Interview Summary Record, Aug. 18, 2009 for U.S. Appl. No. 11/122,498.
Response to Non-final Rejection, Sep. 15, 2009 for U.S. Appl. No. 11/122,498.
Examiner Interview, Jan. 21, 2010 for U.S. Appl. No. 11/122,498.
Final Rejection, Jan. 21, 2010 for U.S. Appl. No. 11/122,498.
Response to Final Rejection, Jun. 16, 2010 for U.S. Appl. No. 11/122,498.
International Search Report, Mar. 20, 2008 for PCT/US2007/016718.
Roger D. Huang et al., Tick Size, Bid-Ask Spreads and Market Structure Feb. 8, 2001, Forthcoming Journal of Financial and Quantitative Analysis, pp. 1-29.
Bar Frijns et al., Price discovery in tick time, Journal of Empirical Financial, vol. 16, Issue 5, Dec. 2009, pp. 759-776.
Tseng, K.C., Supermontage as a New Trading System of NASDAQ, Investment Management and Financial Innovations, Mar. 2005.
Examiner Interview, Aug. 18, 2009 for U.S. Appl. No. 11/122,689.
Response to Non-final Rejection, Aug. 27, 2009 for U.S. Appl. No. 11/122,689.
Notice of Allowance, Dec. 14, 2009 for U.S. Appl. No. 11/122,689.
Notice of Allowance, Jan. 26, 2010 for U.S. Appl. No. 11/122,689.
Notice of Allowance, Mar. 1, 2010 for U.S. Appl. No. 11/122,689.
Notice of Allowance, Jul. 1, 2010 for U.S. Appl. No. 11/122,498.
Non-final Rejection, Oct. 7, 2009 for U.S. Appl. No. 11/345,421.
Response to Non-final Rejection, Nov. 23, 2009 for U.S. Appl. No. 11/345,421.
Notice of Allowance, Apr. 2, 2010 for U.S. Appl. No. 11/345,421.
Notice of Allowance, Aug. 4, 2010 for U.S. Appl. No. 11/345,421.
Response to Final Rejection, Sep. 30, 2009 for U.S. Appl. No. 11/416,942.
Response to Final Rejection, Oct. 7, 2009 for U.S. Appl. No. 11/416,942.
Examiner Interview, Oct. 14, 2009 for U.S. Appl. No. 11/416,942.
Notice of Allowance, Dec. 29, 2009 for U.S. Appl. No. 11/416,942.
Notice of Allowance, Jan. 26, 2010 for U.S. Appl. No. 11/416,942.
Notice of Allowance, Feb. 24, 2010 for U.S. Appl. No. 11/416,942.
Notice of Allowance, Jun. 16, 2010 for U.S. Appl. No. 11/416,942.
Non-final Rejection, Aug. 17, 2009 for U.S. Appl. No. 11/416,710.
Response to Non-final Rejection, Nov. 2, 2009 for U.S. Appl. No. 11/416,710.
Notice of Allowance, Mar. 22, 2010 for U.S. Appl. No. 11/416,710.
Notice of Allowance, Jun. 15, 2010 for U.S. Appl. No. 11/416,710.
Response to Final Rejection, Oct. 13, 2009 for U.S. Appl. No. 11/416,913.
Non-final Rejection, Jan. 22, 2010 for U.S. Appl. No. 11/416,913.
Response to Final Rejection, Jun. 22, 2010 for U.S. Appl. No. 11/416,913.
Response to Non-final Rejection, Nov. 4, 2009 for U.S. Appl. No. 11/416,756.
Final Rejection, Apr. 27, 2010 for U.S. Appl. No. 11/416,756.
Examiner Interview, Mar. 31, 2009 for U.S. Appl. No. 11/416,943.
Non-final Rejection, Sep. 30, 2009 for U.S. Appl. No. 11/416,943.
NASDAQ Launches Liquidity Tracker, HighBeam Research, Dec. 5, 2002.
Response to Non-final Rejection, Dec. 14, 2009 for U.S. Appl. No. 11/416,943.
Non-final Rejection, Mar. 23, 2010 for U.S. Appl. No. 11/416,943.
Response to Non-final Rejection, Jun. 23, 2010 for U.S. Appl. No. 11/416,943.
Restriction Requirement, Aug. 20, 2010 for U.S. Appl. No. 11/881,789.
Response to Restriction Requirement, Sep. 2, 2010 for U.S. Appl. No. 11/881,789.
Non-final Rejection, Aug. 12, 2009 for U.S. Appl. No. 11/527,797.
Response to Non-final Rejection, Nov. 17, 2009 for U.S. Appl. No. 11/527,797.
Final Rejection, Jan. 25, 2010 for U.S. Appl. No. 11/527,797.
Notice of Abandonment, Aug. 3, 2010 for U.S. Appl. No. 11/527,797.
Nonfinal Rejection, May 19, 2009 for U.S. Appl. No. 11/525,363.
Response to Nonfinal, Nov. 16, 2009 for U.S. Appl. No. 11/525,363.
Proposed Examiner's Amendment, Jul. 6, 2010 for U.S. Appl. No. 11/525,363.
Notice of Allowance, Sep. 24, 2010 for U.S. Appl. No. 11/525,363.
Final Office Action, Jul. 21, 2010 for U.S. Appl. No. 11/880,686.
Non-final Rejection, Jul. 6, 2010 for U.S. Appl. No. 11/880,840.
Non-final Rejection, Jun. 30, 2010 for U.S. Appl. No. 11/881,064.
Non-final Rejection, Dec. 1, 2009 for U.S. Appl. No. 11/881,789.
Response to Non-final rejection, Mar. 19, 2010 for U.S. Appl. No. 11/881,789.
Non-final Rejection, Jun. 29, 2010 for U.S. Appl. No. 11/881,788.
International Search Report and Examination, Sep. 22, 2009 for SG 200716675-4.
EIC Search Report, Jul. 2, 2009 for U.S. Appl. No. 11/345,420.
Austrian Patent Office Search Report and Written Opinion, Jan. 30, 2009 for SG 200716681-2.
Final Rejection, Aug. 26, 2010 for U.S. Appl. No. 11/416,943.
Final Rejection, Aug. 18, 2010 for U.S. Appl. No. 11/880,852.
Notice of Allowance, Sep. 7, 2010 for U.S. Appl. No. 11/345,420.
Notice of Allowance, Aug. 31, 2010 for U.S. Appl. No. 11/122,498.
Notice of Allowance, Sep. 14, 2010 for U.S. Appl. No. 11/122,498.
Notice of Allowance, Sep. 20, 2010 for U.S. Appl. No. 11/416,942.
Notice of Allowance, Sep. 27, 2010 for U.S. Appl. No. 11/416,710.
Final Rejection, Sep. 15, 2010 for U.S. Appl. No. 11/416,913.
Nonfinal Rejection, Nov. 6, 2009 for U.S. Appl. No. 11/880,686.
Response to Nonfinal, May 3, 2010 for U.S. Appl. No. 11/880,686.
Dec. 9, 2010 Notice of Allowance, for U.S. Appl. No. 11/345,421.
Nov. 9, 2010 Supplemental Notice of Allowability, for U.S. Appl. No. 11/416,942.
Nov. 4, 2010 Response to Non-final, for U.S. Appl. No. 11/880,840.
Dec. 7, 2010 Notice of Allowance, for U.S. Appl. No. 11/880,840.
Nov. 15, 2010 Response to Final, for U.S. Appl. No. 11/880,686.
Nov. 15, 2010 Notice of Allowance and Interview Summary, U.S. Appl. No. for 11/881,788.
Mar. 17, 2010 Restriction Requirement, for U.S. Appl. No. 11/880,840.
Mar. 26, 2010 Response to Restriction, for U.S. Appl. No. 11/880,840.
Dec. 15, 2010 Supplemental Notice of Allowance, for U.S. Appl. No. 11/122,679.
U.S. Appl. No. 12/928,292, filed Dec. 8, 2010, Adcock, et al.
Dec. 28, 2010 Supplemental Notice of Allowability, for U.S. Appl. No. 11/416,942.
Jan. 18, 2011 Response to Final Rejection, for U.S. Appl. No. 11/416,913.
Jan. 6, 2011 Notice of Allowance, for U.S. Appl. No. 11/881,788.

* cited by examiner

EFFICIENT DATA DISSEMINATION FOR FINANCIAL INSTRUMENTS

BACKGROUND

Market centers within some financial sectors, such as the equity, equity option and commodity markets, cooperate by adopting common message formats and dissemination rules for trade-related data. In some sectors, participating market centers have established a single entity or organization to consolidate all of their outbound market data streams, giving market data recipients a single source for all of the marketplace's real-time data. For example, the Options Price Reporting Authority (OPRA) was established by participating equity option market centers to receive and consolidate their several feeds into one, then disseminate the consolidated market data to subscribed market data recipients.

However, the volume of data disseminated by individual market centers continues to grow, putting down-stream consolidation systems, such as OPRA, at increasing risk of being overwhelmed. Participating market centers can generate vast amounts of data and disseminate it at high rates. Presently, market data systems typically disseminate all data on all listed instruments, regardless of whether a given instrument has seen recent market activity. Potentially, any one market center disseminating at a high data throughput rate might overwhelm the down-stream consolidation system. This can disadvantage all of the market centers by monopolizing the consolidator's data processing resources, possibly causing delays in the data being sent by the consolidator to downstream recipients. Any delay in downstream data is viewed as a very serious problem by market centers and consolidators, since even the smallest data delays degrade the data and pose a threat to investors. To reduce the risk of market centers flooding the consolidation systems, market centers often agree to individual thresholds on the amount of data they can disseminate to the consolidation entity. Any such thresholds are referred to herein as throughput limits.

In order to discourage market centers from exceeding their throughput limits, penalties are typically imposed, such as fines levied against the offending market center. Data consolidators, such as OPRA, typically have the additional power to address excessive throughput rates in real-time by physically throttling the offending market center's data stream. This throttling ability helps the data consolidator protect against data processing delays by bringing the offending market center's dissemination rate back under its assigned threshold. Conversely, because a market center can be enormously disadvantaged if it cannot disseminate all of its trade-related market data in real time to the consolidator, there is a constant tension between the market center's need to disseminate all real-time trade related data, and the need to protect downstream systems from being flooded.

Accordingly, there is need for a method and system that reduces the overall volume of data disseminated to a data consolidation entity without degrading the high quality real-time data disseminated to the data consolidation entity.

SUMMARY

According to one aspect of the present invention, a method for suppressing non-pertinent market data from being reported by a market center throughout the financial marketplace includes providing a market center having a plurality of financial instruments listed thereon, wherein each listed financial instrument has at least one record associated with it which includes pricing information for the listed financial instrument. Further, according to this aspect of the invention, the market center reports the pricing information throughout the financial marketplace.

According to this aspect of the present invention, the method monitors the trading activity of the plurality of financial instruments listed on the market center throughout the financial marketplace and flags the records for a listed financial instrument for reporting suppression when the financial instrument has not traded within a pre-determined time period in the financial marketplace.

The method, according to this aspect of the present invention, suppresses information on the flagged listed financial instruments when the market center reports pricing information throughout the financial marketplace.

DESCRIPTION OF THE DRAWINGS

These and other features, aspects and advantages of the present invention will become better understood with regard to the following description, appended claims and accompanying drawings where:

DETAILED DESCRIPTION

Figure 1:
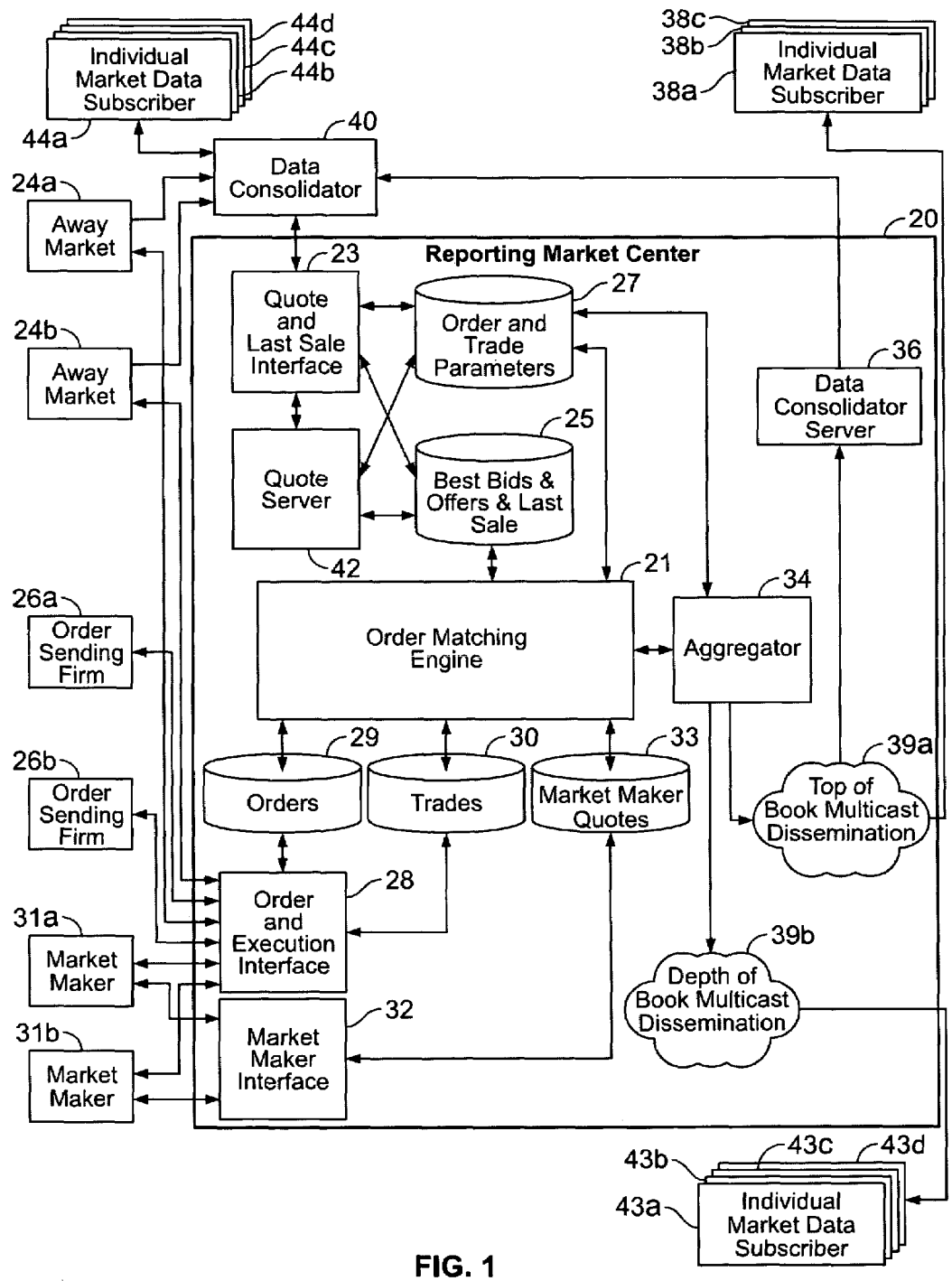
FIG. 1 is a block diagram illustrating the data dissemination environment in which an embodiment of the present invention operates.

Referring to FIG. 1, an exemplary reporting market center 20, in an active market environment, is depicted. The examples discussed herein primarily describe the use and application of the present invention in an equity options market center environment, but it should be understood that the present invention could be used in any type of financial instrument market center environment (e.g., equities, futures, bonds, etc.). The market environment of this embodiment includes a reporting market center 20 which interacts with a number of other market centers 24 (i.e., away markets), traders at order sending firms 26 and market makers 31. It should be understood that the trading environment of this embodiment supports but does not require market makers 31, a market maker interface 32, or market maker quotes 33. It should also be understood that the reporting market center 20 referred to herein refers to a computing system having sufficient processing and memory capabilities and does not refer to a specific physical location. In fact, in certain embodiments, the computing system may be distributed over several physical locations. It should also be understood that any number of traders 26 or market makers 31 or away market centers 24 can interact with the reporting market center 20. The reporting market center 20 is the market center on which a specific trader at an order sending firm 26 posts a specific order, and on which a specific market maker 31 posts a specific quote, and those orders and quotes, and trades resulting therefrom, are reported out. The reporting market center 20 includes an order matching engine 21, which validates, maintains, matches and processes all orders and quotes on the reporting market center 20. In this embodiment, the code for the order matching engine 21 is stored in the reporting market center's fixed storage media and loaded into system memory at run time.

The reporting market center 20 may also include a quote and last sale interface 23 that, in this embodiment, interacts with a data consolidator 40 to capture quote and last sale information. This quote and last sale information is stored in a best bids and offers and last sales data structure 25. This data structure 25 is where the market best bid and offer information is stored. Because the quote and last sale interface 23 receives every trade record for each instrument across all market centers, including the given reporting center 20 and all participating away market centers 24, it has a record of the last date every listed instrument traded, regardless of which market center 20, 24 executed the trade. The last date an instrument traded is referred to as "last trade date" herein. The reporting market center 20 may also include a quote server 42 which monitors the trading activity of instruments listed on the market center 20 and updates the trading parameters of a listed instrument on an order and trade parameters data structure 27, included within the reporting market center 20.

The order and trade parameters data structure 27 stores pre-defined trading parameters and rules that are used by the order matching engine 21 in reporting orders, matching orders and executing trades. The reporting market center 20 may also include an order and execution interface 28 which allows the traders 26, the market makers 31 and the away market centers 24 to interact with the market center 20. The order and execution interface 28 also interacts with the order matching engine 21 in the order execution process. The reporting market center 20 may also include an order information data structure 29 where order information is stored and a trade information data structure 30 where completed trade information is stored. The reporting market center 20 may also include a market maker interface 32 that interacts with market makers 31 to capture market maker bids and offers in assigned issues. These bids and offers are tracked and stored in a market maker quotes structure 33 in this embodiment. In another embodiment, the market maker bids and offers may physically reside in the away market center best bids and offers data structure 25.

Throughout the discussion herein, it should be understood that the details regarding the operating environment, data structures, and other technological elements surrounding the reporting market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

The reporting market center 20 of this embodiment may also include an aggregator 34. The aggregator 34 is passed incoming quotation and order data from the order matching engine 21. The aggregator 34, in turn, reads this incoming quotation and order data and consolidates the best price and aggregate volume for each instrument. Ultimately, in this embodiment, the aggregator 34 disseminates two types of aggregated records to market data subscribers 38a-d, 43a-d. One such multicast data dissemination feed is the "top of book" feed 39a, which includes only the best prices (along with the aggregate volumes) for each instrument, while the other feed 39b, the "depth of book" feed, carries the top five best prices (and respective aggregate volumes) for each instrument.

In this embodiment, only the best price or "top of book" data is sent to the common data consolidator 40. In this embodiment, the market center system component responsible for such dissemination is referred to as the data consolidator server 36. In the preferred embodiment of the invention, the data consolidator server 36 receives the top of book multicast dissemination 39a generated by the aggregator 34. However, it should be noted that in other embodiments of the present invention, the data may be disseminated using any suitable communications methodology without affecting the nature of the invention. The top of book data is immediately disseminated by the data consolidator server 36 to the data consolidator 40.

At the same time that the data consolidator 40 is receiving the top of book data from the market center 20, the data consolidator 40 is also simultaneously receiving top of book data from all other participating market centers 24 (i.e., away markets). The data consolidator 40 consolidates the many feeds into one feed and disseminates the consolidated data stream to all data consolidator subscribers 44a-d. In this embodiment, the market center 20 depicted is also a data consolidator subscriber, with the data consolidator 40 sending the data consolidation feed to the quote and last sale interface 23 of the reporting market center 20.

Figure 2:
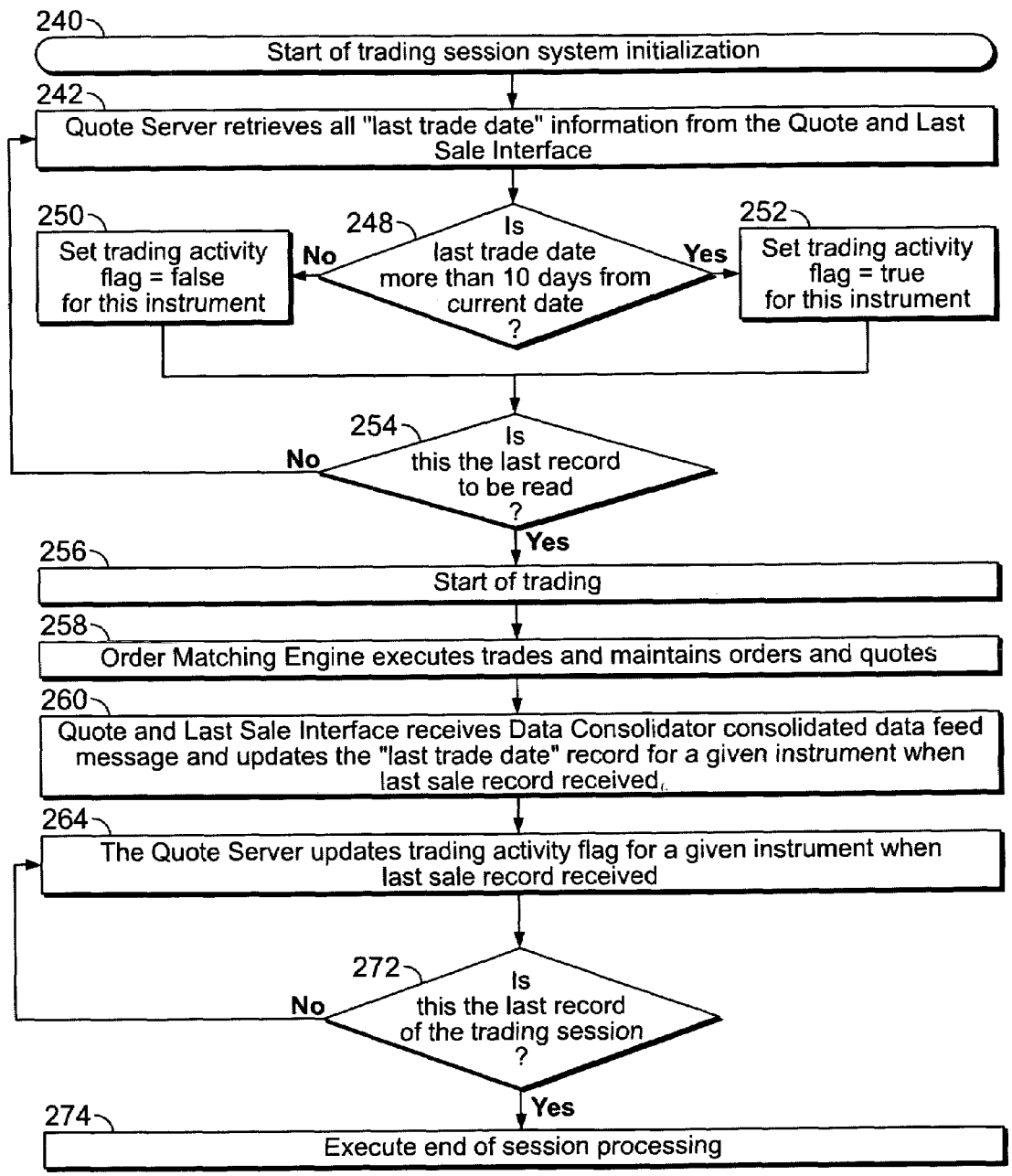
FIG. 2 is a flow diagram illustrating a process implemented in an embodiment of the present invention to set the reporting status of an instrument listed on a reporting market center.

Referring to FIG. 2, the process, in a preferred embodiment, for setting which instruments the market center 20 reports on and does not report on is illustrated. As indicated at step 240, the system initializes at the start of a trading session. As part of the initialization, the quote server 42 retrieves the last trade date for every individual instrument listed within the market center 20 from the quote and last sale interface 23 as indicated at step 242. Then, in this embodiment, at step 248, for every instrument, the process identifies whether or not a given instrument has traded within the past ten (10) days. By doing this for each instrument, the process determines which instruments have not traded (or have been inactive) in recent trading and, therefore, determines that there is limited to no market interest in them. As such, these instruments do not need to be reported out and reporting bandwidth can be saved. It should be understood that the number of days of inactivity is not limited to ten (10) days and that any number of days of inactivity could be used as a trigger point (e.g., 3 days, 4 days, etc.).

Figure 4:
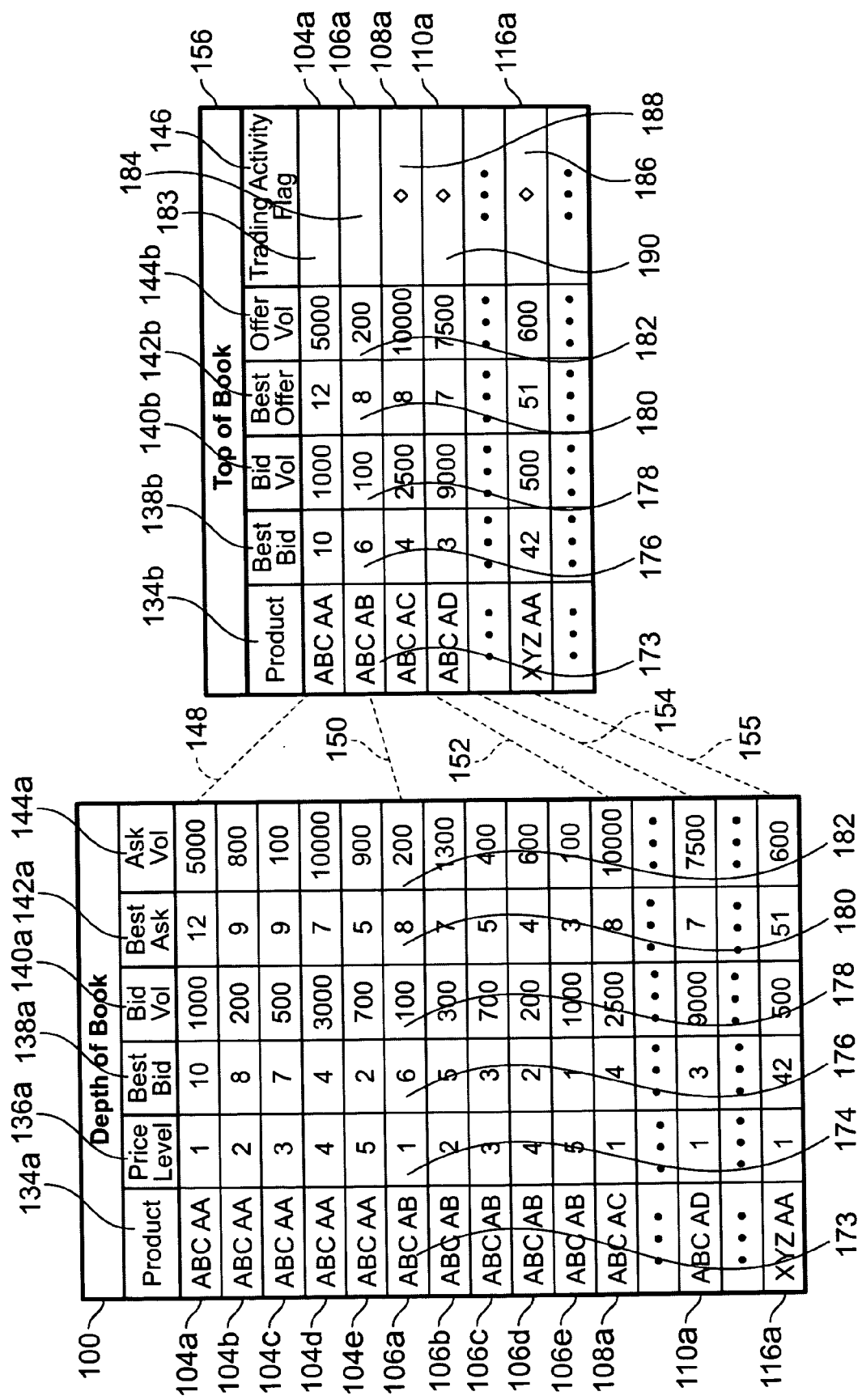
FIG. 4 depicts an exemplary depth of book data structure and a top of book data structure.

If, at step 248, the process determines that the instrument under evaluation has traded recently (i.e., has traded within the last ten (10) days), a trading activity flag 146 (FIG. 4), stored in the order and trade parameters data structure 27, for the instrument under evaluation is flagged as "false," as indicated at step 250, and is reported out as explained in detail below. If, on the other hand, at step 248, the process determines that the instrument under evaluation has not traded recently (i.e., has not traded within the last ten (10) days), the flag 146 for the instrument under evaluation is set to "true," as indicated at step 252 and depicted for record 108a in FIG. 4. An instrument with the flag 146 set to "true" is referred to as an instrument with a "dark flag" herein. In this invention, order and quotation data for an instrument with a "dark flag" is suppressed and not sent to the data consolidator 40, since the marketplace does not have enough interest in this instrument to justify using the limited bandwidth to report on it. As indicated at step 254, this process continues until every instrument listed on the market center 20 is evaluated. As indicated in FIG. 2, the flag for every instrument is evaluated and set prior to the start of trading. Regarding FIG. 4, it should be noted that in the present implementation of this invention, the depth of book 100 and top of book 156 data is physically stored in one data structure. However, for illustrative purposes, the data is depicted in FIG. 4 and referred to herein as though it were stored in separate data structures.

As indicated at steps 256 and 258, trading starts, and the order matching engine 21 begins, and continues throughout the trading session, to execute trades and maintain orders and quotes. During the trading session, as indicated at step 260, the quote and last sale interface 23 continuously receives and stores the consolidated market data feed messages from the data consolidator 40 to the data structure 25. Since the consolidated feed disseminates every trade record that occurs for every instrument at every participating market center 20, 24, the quote and last sale interface 23 is assured of having a fully comprehensive set of last trade date information for every instrument. As part of this process, the quote and last sale interface 23 updates the "last trade date" information for each instrument listed on the market center 20. At step 264, the quote server 42 receives quote and last sale records from the quote and last sale interface 23. For every last sale record, the quote server 42 updates the trading activity flag 146 setting for the given instrument to "false" within the order and trade parameter data structure 27. By doing this, the process ensures any instrument that trades (or has been active) has its trading activity flag 146 set to "false," indicating recent activity.

If a given instrument has traded during the trading session, the trading activity flag 146 for the instrument under evaluation is automatically set to "false". In other words, if the flag was previously "false," it will remain set to "false" and data will continue to be reported out. If the flag was previously "true", it is reset to "false," and going forward, until this instrument is inactive for the required amount of time, all data is reported out. If, on the other hand, a "dark" instrument has not traded during the trading session, the flag 146 for the instrument will never be automatically overwritten and the flag 146 remains set to "true." As indicated at step 272, this process continues throughout the trading session until the last record of the session is reached. At that point, the end of trading session processing is invoked as indicated at step 274.

It should be understood that if a market participant has an interest in a listed instrument that has a "dark flag" on it, the "dark flag" may be manually overridden so that it will be reported on during the given trading session. This override can be effectuated by manually changing the instrument's "dark flag" from "true" to "false" within the order and trade parameters data structure itself 27. In this embodiment, however, unless a trade occurs in the manually-overridden listed instrument during the trading session that the override is in place, the trading activity flag 146 will automatically be re-set to "true" (i.e., the "dark flag" will be reinstated) at the start of the next trading session when systems are initialized 240. The information for this instrument will once again be suppressed, unless manually overridden again in the new trading session.

Figure 3:
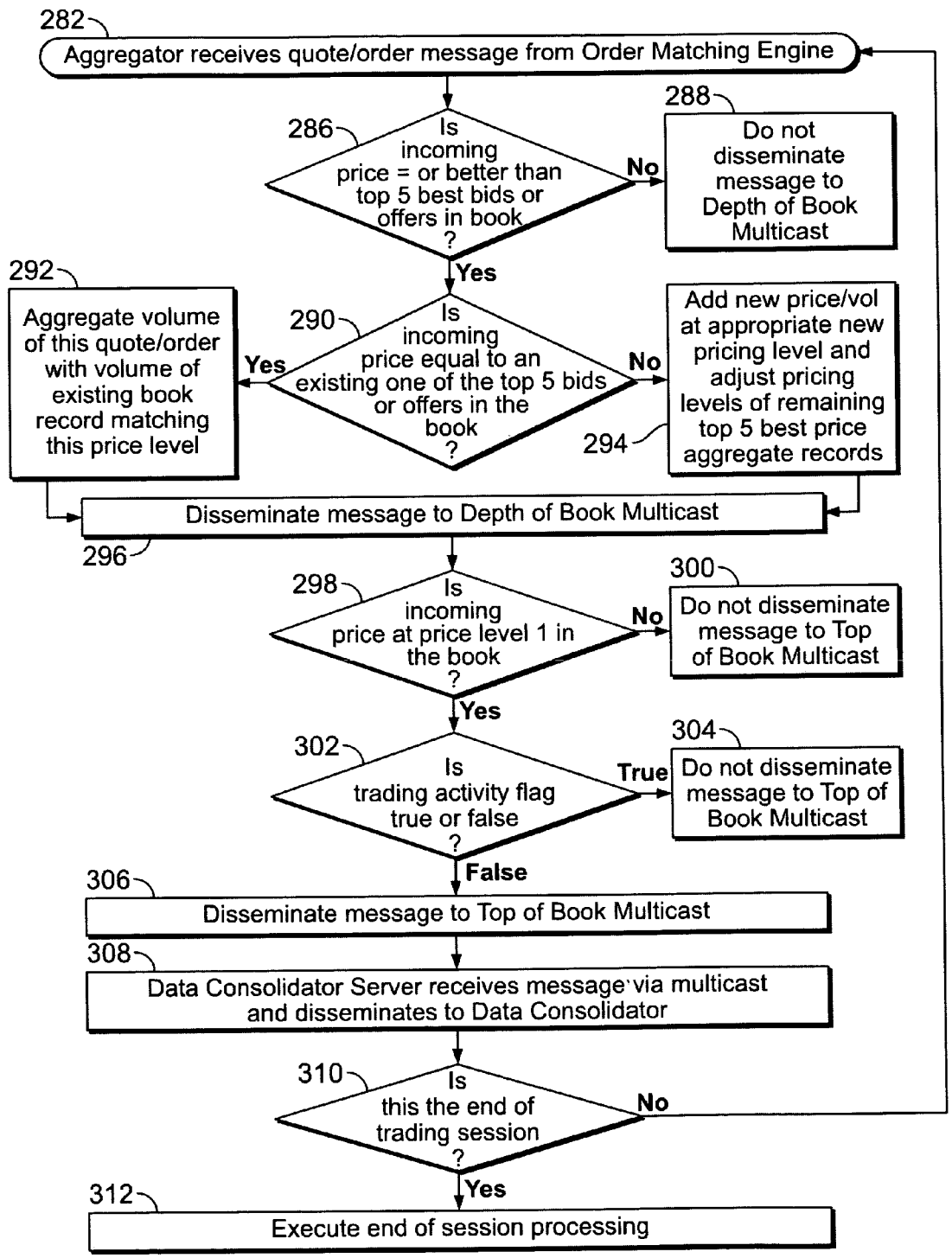
FIG. 3 is a flow diagram illustrating a process implemented in an embodiment of the present invention to determine what quote or order information is reported out from a reporting market center.

During the trading session, while the quote server 42 is monitoring all markets (via the Data Consolidator 4)) for trading activity in the instruments listed on the reporting market center 20 and updating the instruments' records accordingly, the aggregator 34 is consolidating order and quote information and reporting it out. Referring now to FIG. 3, the process for reporting out from the reporting market center 20 is illustrated, and FIG. 4 illustrates exemplary depth of book and top of book data structures 100, 156. As mentioned previously, the depth of book 100 and top of book 156 data structures may be maintained as a single structure or as multiple structures without impacting the present invention. Two structures are illustrated here for clarity. At step 282, the aggregator 34 receives quotation and order message information from the matching engine 21. At step 286, the aggregator 34 starts the process of comparing the received bid or offer price information to the best bids and offers in the book. At step 286, the process determines whether the price of the incoming order or quote is equal to or better than the top five best bids or offers in the book. If at step 286, the process determines that the price of the incoming order or quote is equal to or better than the top five prices for the given instrument, then it qualifies to be reported out as depth of book data 39b, and the process proceeds to step 290. If, on the other hand, it is determined that the price of the incoming order or quote is not equal to or better than the top five best prices, then the price is not reported out, and the process, for this order or quote message, ends as indicated at 288.

At step 290, the process determines if the incoming price of the order or quote message is equal to an existing depth of book price. If the incoming price is equal to an existing depth of book price, the aggregator 34, at step 292, adds the volume for the incoming order or quote to the existing volume record for the given instrument at that price level to obtain an aggregate total volume. Then at step 296, the aggregator 34 disseminates the now updated record information to the depth of book multicast 39b. An exemplary depth of book data structure 100 is depicted in FIG. 4.

If, on the other hand, at step 290 the process determines that the incoming price is within the top five best prices, but does not match any existing price, the aggregator 34, as indicated at step 294, must create a new price level record for the given instrument, insert it into the appropriate place within the top five depth of book prices and remove a price record that has been displaced because it is no longer in the top five. At step 296, the process disseminates the now updated record information to the depth of book multicast 39b. In this embodiment, it should be noted that depth of book record information is disseminated without regard to whether the instruments that are being reported on have recently traded. In other embodiments, however, this may be changed by implementing the invention disclosed and described herein for depth of book data.

If an incoming price also happens to be to be the best bid or best offer for a given instrument, then the incoming order or quote may also have to be disseminated in the top of book multicast feed 39a. An exemplary top of book data structure 156 is depicted in FIG. 4. To determine if the incoming order or quote needs to be disseminated in the top of book multicast 39a, the process, at step 298, determines if the incoming price is at price level 1 in the depth of book data structure 100. If it is not, the incoming order or quote is not disseminated in the top of book multicast 39a, as indicated at 300. If, on the other hand, the incoming price is at price level 1, the process proceeds to step 302 where it accesses the order and trade parameter data structure 27 to determine whether the trading activity flag 146 for the instrument under evaluation is set to "true" or "false". If the flag 146 is set to "false" (meaning the instrument under evaluation has had recent trading activity), then the incoming order or quote is reported in the top of book multicast 39a, as indicated at 306. If, on the other hand, the flag 146 is set to "true" or has a "dark flag" (meaning the instrument under evaluation has not had recent trading activity), then the incoming order or quote is not reported in the top of book multicast 39a, as indicated at 304.

Referring to step 308, orders and quotes that are not "dark" and are included in the top of book multicast 39a are received by the data consolidator server 36 which sends them to the data consolidator 40, where the order or quotes are added to the consolidated market data feed. As indicated at step 310, the aggregator 34 continues processing orders and quote messages until the end of the trading session, and at the end of the trading session, as indicated at 312, the aggregator 34 executes end of trading session processing.

Referring to FIG. 4, it can be seen that, in this illustration, depth of book and top of book data structures 100, 156 share most of the same basic data fields for each instrument because the data in the top of book data structure 156 is a subset of the data contained in the depth of book data 100. It should be understood that the depictions provided are simplified, exemplary representations for illustration purposes of the actual data contained in these types of messages, and only the fundamental data common to both are discussed herein. Both types of records have product or listed instrument data 134a, 134b; best bid data 138a, 138b; bid volume data 140a, 140b; best ask data 142a, 142b and ask volume data 144a, 144b. As explained below, only the depth of book records 100 require price level indicators 136a, and as explained above, in this embodiment, only the top of book records 156 require trading activity flags 146. The data illustrated in the depth of book data structure 100 is required to be more expansive, providing several layers of best prices, with aggregated volumes at each level for each instrument. The top of book data 156, as its name states, only includes the market information for bids and offers at the top of the book.

In this embodiment, only top of book data is reported out to the data consolidator 40. As such, the trading activity flag 146 is only required for top of book data 156. The data illustrated in the depth of book data structure 100 does not need to be limited for reporting purposes with a trading activity flag in this embodiment. The depth of book data 100, in this embodiment, contains multiple records (e.g., 104a-e, 106a-e, 108a, 110a, 116a, etc.). As is apparent, in the depth of book data structure 100, a listed instrument may have multiple records, such as the data records for listed instrument ABC AA (i.e., records 104a-e). The various records for the product are distinguished by the price level indicator 136a, which shows the best price for the product, the next best price, and so on, through five levels of pricing. Referring to the record indicated at 106a for ABC AB (173), for example, the best prices for this instrument are a bid of 6 at price level "1", as indicated at 176 and 174 respectively, with an aggregated total of 100 shares, as indicated at 178, and an ask of 8, as indicated at 180, with an aggregated total of 200 shares, as indicated at 182. In this example, for instrument ABC AB, this information means that, at the present moment in time, the most anyone is willing to pay for the instrument is $6 and the most anyone is willing to sell the instrument for is $8. The next best prices and the respective volumes for the same instrument are depicted in the next row at 106b.

In contrast to the data in the depth of book data structure 100, the data in the top of book data structure 156 is only for the best bid 138b and the best offer 142b (and their associated volumes 140b, 144b) for each instrument, making the ranking of price level information moot and explaining why the top of book data structure 156 does not require a price level parameter comparable to the one found in the depth of book data structure 100. As explained above, the data illustrated in the top of book data structure 156 is simply a subset of the data from the depth of book data structure 100. Namely, the data in the top of book data structure 156 is the same as the data records at price level "1" in the depth of book data structure 100. The records at the price level "1" in the depth of book data structure 100 map directly to the same instrument's record in the top of book data structure 156, as indicated at 148, 150, 152, 154 and 155. In this example, it can be seen at 183 and 184 that listed instruments ABC AA and ABC AB do not have a dark flag and are reported out in the top of book multicast 39a. Listed instruments ABC AC, ABC AD and XYZ AA, on the other hand, have the trading activity flag 146 set to "true," as indicated at 186, 188 and 190, meaning they have a "dark flag." The information for these listed instruments, accordingly, is not reported out.

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

The invention claimed is:

1. A method, comprising:
   (a) listing by a computing system a plurality of financial instruments on a market center, wherein each of the plurality of financial instruments is associated with at least one record having pricing information for the financial instrument and wherein the market center reports the pricing information throughout a financial marketplace;
   (b) monitoring by the computing system, the trading activity of the plurality of financial instruments throughout the financial marketplace;
   (c) flagging by the computing system, the records for at least one of the plurality of financial instruments for reporting suppression when the at least one of the plurality of financial instruments has not traded within a pre-determined time period in the financial marketplace; and
   (d) suppressing by the computing system, the pricing information of the at least one of the plurality of financial instruments that are flagged when the market center reports pricing information throughout the financial marketplace, wherein the at least one of the plurality of financial instruments are still listed on the market center.

2. The method of claim 1, wherein the pre-determined time period is ten days.

3. The method of claim 1, wherein the at least one of the plurality of financial instruments that are flagged are manually overridden.

4. The method of claim 1, wherein the record for each of the plurality of financial instruments further includes volume information, for each of the plurality of financial instruments and further comprises:
   (e) aggregating by the computing system, the records with the pricing and volume information for the plurality of financial instruments on the market center; and
   (f) reporting by the computing system, the aggregated pricing and volume information throughout the financial marketplace for the plurality of financial instruments that are not flagged.

5. The method of claim 1, wherein the flagging step (c) occurs at the start of a trading session.

6. The method of claim 1, wherein the monitoring step (b) occurs throughout a trading session.

7. The method of claim 1, wherein the computing system is one or more programmed computers.

8. The method of claim 1, wherein the computing system is distributed over several physical locations.

9. A system, comprising:
   (a) a plurality of financial instruments listed on the system, wherein each of the plurality of financial instruments is associated with at least one record having pricing and volume information for the financial instrument;
   (b) a quote and last sale interface, a quote server, and an aggregator;
   (c) at least one memory for storing code for monitoring trading activity, reporting on the plurality of financial instruments and suppressing reporting on one or more of the plurality of financial instruments;

(d) at least one processor for executing the code for monitoring trading activity, reporting on the plurality of financial instruments and suppressing reporting, wherein the code, when executed by the system:

(d)(i) monitors the trading activity of the plurality of financial instruments throughout a financial marketplace;

(d)(ii) flags the records for at least one of the plurality of financial instruments for reporting suppression when the at least one of the plurality of financial instruments has not traded within a pre-determined time period in the financial marketplace;

(d)(iii) suppresses the pricing and volume information of the at least one of the plurality of financial instruments when the system reports pricing information throughout the financial marketplace, wherein the at least one of the plurality of financial instruments are still listed on the market center;

(d)(iv) aggregates the records on the system; and (d)(v) reports the aggregated pricing and volume information of the records throughout the financial marketplace for the plurality of financial instruments that are not flagged.

10. The system of claim 9, wherein the pre-determined time period is ten days.

11. The system of claim 9, wherein the at least one of the plurality of financial instruments that are flagged may be manually overridden.

12. The system of claim 9, wherein the code flags (d)(ii) at the start of a trading session.

13. The system of claim 9, wherein the monitors the trading activity of a listed financial instrument and flagging the listed financial instrument for reporting suppression occurs throughout a trading session.

14. The system of claim 9, wherein the system is a computing system.

15. The system of claim 9, wherein the system includes one or more programmed computers.

16. The system of claim 9, wherein the system is distributed over several physical locations.

17. A method comprising:

(a) listing by a computing system a plurality of financial instruments on a market center, wherein each of the plurality of financial instruments is associated with at least one record having pricing information for the financial instrument and wherein the market center disseminates the pricing information to a data consolidator;

(b) monitoring by the computing system, the trading activity of the plurality of financial instruments throughout a financial marketplace;

(c) flagging by the computing system, the records for at least one of the plurality of financial instruments for dissemination suppression when the at least one of the plurality of financial instruments has not traded within a predetermined time period in the financial marketplace; and (d) suppressing by the computing system, the pricing information of the at least one of the plurality of financial instruments that are flagged when the market center disseminates pricing information to the data consolidator, wherein the at least one of the plurality of financial instruments are still listed on the market center.

18. The method of claim 17, wherein the pre-determined time period is ten days.

19. The method of claim 17, wherein the at least one of the plurality of financial instrument that are flagged are manually overridden.

20. The method of claim 17, wherein the record for each of the plurality of financial instruments further includes volume information, for each of the plurality of financial instruments and further comprises:

(e) aggregating by the computing system, the records with the pricing and volume information for the plurality of financial instruments on the market center; and (f) disseminating by the computing system, the aggregated pricing and volume information to the data consolidator for the plurality of financial instruments that are not flagged.

21. The method of claim 17, wherein the flagging step (c) occurs at the start of a trading session.

22. The method of claim 17, wherein the monitoring step (b) and the flagging step (c) occurs throughout a trading session.

23. The method of claim 17, wherein the computing system is one or more programmed computers.

24. The method of claim 17, wherein the computing system is distributed over several physical locations.

25. A computing system, comprising:

(a) a plurality of financial instruments listed on the computing system, wherein each listed financial instrument has at least one record associated with it which includes pricing and volume information for the listed financial instrument;

(b) a quote and last sale interface, a quote server, an aggregator and a data consolidator server;

(c) at least one memory for storing code for monitoring trading activity, disseminating information on the listed financial instruments and suppressing information on certain listed financial instruments where necessary;

(d) at least one processor for executing the code for monitoring trading activity, disseminating information on the listed financial instruments and suppressing information on certain listed financial instruments, wherein the code, when executed by the computing system:

(d)(i) monitors the trading activity of the plurality of financial instruments listed on the computing system throughout a financial marketplace;

(d)(ii) flags the records for at least one of the plurality of financial instruments for suppression when the at least one of the plurality of financial instruments has not traded within a pre-determined time period in the financial marketplace;

(d)(iii) suppresses the pricing and volume information of the at least one of the plurality of financial instruments when the market center disseminates pricing information to the data consolidator, wherein the at least one of the plurality of financial instruments are still listed on the market center;

(d)(iv) aggregates the records for the plurality of listed instruments on the computing system; and (d)(v) disseminates the aggregated pricing and volume information of the records to the data consolidator for the plurality of financial instruments that are not flagged.

26. The computing system of claim 25, wherein the pre-determined time period is ten days.

27. The computing system of claim 25, wherein the at least one of the plurality of financial instruments that are flagged are able to be manually overridden.

28. The computing system of claim 25, wherein the flags element (d)(ii) occurs at the start of a trading session.

29. The computing system of claim 25, wherein the monitors element (d)(i) and the flags element (d)(ii) occurs throughout a trading session.

30. The computing system of claim 25, wherein the computing system is one or more programmed computers.

31. The computing system of claim 25, wherein the computing system is distributed over several physical locations.

* * * * *